United States Patent [19]

Koga

[11] 4,249,947
[45] Feb. 10, 1981

[54] REPAIRING MORTARS FOR SILICON CARBIDE BRICKS

[75] Inventor: Haruyoshi Koga, Hachinohe, Japan

[73] Assignee: Hachinohe Smelting Co., Ltd., Tokyo, Japan

[21] Appl. No.: 61,551

[22] Filed: Jul. 27, 1979

[30] Foreign Application Priority Data

Jul. 3, 1979 [JP] Japan ................................. 54-83484

[51] Int. Cl.³ ............................................ C04B 35/48
[52] U.S. Cl. ..................................................... 106/57
[58] Field of Search ...................................... 106/57, 85

[56] References Cited

U.S. PATENT DOCUMENTS

| | | | |
|---|---|---|---|
| 2,773,776 | 12/1956 | Weidman | 106/57 |
| 3,179,526 | 4/1965 | Dolph | 106/57 |
| 3,379,544 | 4/1968 | Burhans et al. | 106/57 |
| 3,447,936 | 6/1969 | Ornitz | 106/57 |

*Primary Examiner*—James Poer
*Attorney, Agent, or Firm*—Sughrue, Rothwell, Mion, Zinn and Macpeak

[57] ABSTRACT

In structures of silicon carbide brick the leakage of molten metal or vaporous metal through breaks in joints or a crack is prevented by hot applying mortar comprising a major component of zircon and a minor component of borates or boric acid, phosphoric acid and colloidal silica to the breakages. Adhesiveness of mortar to the breakages is improved by incorporating further agalmatolite or kaolin into the mortar.

5 Claims, No Drawings

REPAIRING MORTARS FOR SILICON CARBIDE BRICKS

BACKGROUND OF THE INVENTION

This invention relates to a process for the repair of breakages or cracks in silicon carbide brick structures and mortars therefor.

In smelting, particularly zinc smelting, silicon carbide bricks are used for furnace structures in the vertical distillation process and electrothermal process and attached equipments thereof. Further, in the installation of multistage rectification towers where zinc produced by the above processes is further rectified, silicon carbide bricks of good heat conduction, mechanical strength and antispalling are used.

Particularly, retorts in the vertical distillation process, condensers in the electrothermal process and the tray and condenser in the rectification tower constitute major apparatus portion, which are very important for each of the processes and therefore, using silicon carbide bricks is an indispensable requirement. Silicon carbide mortars are used in joints between bricks.

The silicon carbide brick is oxidized on its surface at an elevated temperature under an oxidizing at atmosphere, and the extreme case is that the oxidation reaction advances towards the inside and therefore the brick is brought to swelling and breaking. Even when the oxidation is confined to the surface of the bricks, the oxidation layer has a heat conductivity reduced to about one tenth so that heat efficiency is reduced. Therefore the brick surface is usually covered with a clay type glaze.

The retort, condenser, tray and the like are heated to a high temperature of 600°–1,300° C. and exposed to vaporous metal, e.g. zinc vapor. The largest disadvantages of the silicon carbide brick are sensitivity to thermal change at high temperatures and to local heating so that a crack and a break in joints take place at a temperature change of about 30° C./hr. Further, since the interior of these brick structures is under a pressure of 10 to hundreds mm $H_2O$ higher than the outside due to zinc vapor, cracking and breaking in joints result in leaking of zinc vapor or molten zinc escape. Accordingly, it is necessary to discontinue the operation of the installation or build a new furnace.

For preventing the leakage of vaporous metal or molten metal through cracks or breaks in joints, there has been heretofore employed a method of sealing breakages to be repaired by hot spraying or coating an alumina or silicon carbide type mortar. However, with these mortars a satisfactory sealing effect on the leakage of vaporous metal or molten metal cannot be obtained.

Further, in some cases the repair working itself brings about a drastic thermal distortion to cause new cracks. Also, when a large amount of mortar is applied by spraying, the surface of silicon carbide brick is covered with a coating of low heat conductivity and as a result, in addition to lowering of efficiency of the installation, normal combustion in the furnace is hindered because of accumulating of the mortar.

SUMMARY OF THE INVENTION

An object of this invention is to provide a repairing mortar for breakage and cracks in a silicon carbide brick structure, exhibiting a sealing effect on the leakage of vaporous metal or molten metal with a small amount of coating.

Another object of this invention is to provide a process for the repair of breakage and cracks in a silicon carbide brick structure by hot applying a specific mortar to the breaks and cracks.

In accordance with this invention, the leaking of molten metal or vaporous metal through the breaks and cracks is prevented by hot applying mortar comprising a major component of zircon and a minor component of borates or boric acid, phosphoric acid and colloidal silica to the breakages to be repaired. Agalmatolite or kaolin is further incorporated into the mortar to improve the adhesiveness of mortar to the breakages.

DETAILED DESCRIPTION OF THE INVENTION

Mortars which may be used in this invention comprise about 60–85% by weight of zircon, about 0.5–2.0% by weight of borates or boric acid, about 3–10% by weight of phosphoric acid, about 0.5–2.0% by weight of colloidal silica and 0–20% by weight of agalmatolite or kaolin. By incorporating borates or boric acid and phosphoric acid into the composition, the melting point of the major component zircon is lowered so that the adhesion of the major component to clay on the brick surface and to a rough surface of silicon carbide is made secure. Further, colloidal silica is added to render the mortar viscous so as to improve workability.

Agalmatolite or kaolin is added to the composition to increase stickiness is kneading of the mortar with water and to improve adhesiveness of the coating after repair so as to prevent the peripheral margin of the coating from peeling off. It is considered that the improvement of the mortar in kneading property is due to the water of crystallization of agalmatolite or kaolin.

The addition amount is determined depending on breakages to be repaired and the temperature of the furnaces, though the upper limit is about 20% by weight in general and about 5–20% by weight is preferred.

Also, for preventing the coating of mortar from peeling off, it is preferred that the zircon be composed of coarse particles of 50 to 100 mesh and fine particles of more than 100 mesh in a suitable ratio, preferably the former being about 23–37% by weight and the latter being about 63–77% by weight.

The preferred composition ratio by weight of the mortar is, for example, as follows:

Zircon (50–100 mesh)—$ZrO_2$ more than 60% about 15–25%

Zircon (more than 100 mesh)—$ZrO_2$ more than 60% about 45–60%

Borates or Boric acid—about 0.5–2.0%

Phosphoric acid—about 3–10%

Colloidal silica (water content 77.4%)—about 0.5–2.0%

Agalmatolite or kaolin—about 0–20%

Water—0–20%

The above-mentioned components are mixed and stirred by means of a usual mortar stirrer for at least 15 minutes till the zircon powder has disappeared entirely.

The application of the mortar to breaks in joints of silicon carbide brick and cracks is effected, for example, by rubbing it therein with a suitable rod or brush. Also, in building a furnace the mortar may be applied preliminarily to the peripheral margin of a joint where the leaking is presumed. The temperature for application of mortar is preferably 800°–1,400° C.

According to this invention, a good effect of sealing on the leakage is obtained by merely applying a small amount of the mortar to a limited area of the breakages.

EXAMPLE 1

Zircon (50–100 mesh), $ZrO_2 > 60\%$ 22.4 parts by weight
Zircon (more than 100 mesh), $ZrO_2 > 60\%$ 55.1 parts by weight
Borax—1.3 parts by weight
Phosphoric acid (Specific gravity 1.7)—6.5 parts by weight
Colloidal silica (Water content 77.4%)—1.3 parts by weight
Water—13.4 parts by weight The above components were mixed and stirred by means of a usual mortar stirrer more than 15 minutes.

The mortar thus obtained was coated on breaks in joints and cracks formed on the silicon carbide structure surface of the tray and condenser in a zinc rectification tower by rubbing it therein with a brush.

At this time the inner temperature of the installation was 907°–920° C. and the temperature of atmosphere on the coated surface was 1,150°–1,200° C. Good sealing effect on the leakage of zinc vapor and molten zinc was attained without interrupting the operation.

EXAMPLE 2

Zircon (50–100 mesh), $ZrO_2 > 60\%$ 19.4 parts by weight
Zircon (more than 100 mesh), $ZrO_2 > 60\%$ 47.7 parts by weight
Borax—1.1 parts by weight
Phosphoric acid (Specific gravity 1.7)—5.6 parts by weight
Colloidal silica (Water content 77.4%)—1.1 parts by weight
Agalmatolite—13.5 parts by weight
Water—11.7 parts by weight The above components were mixed and stirred by means of a usual mortar stirrer more than 15 minutes.

The mortar thus obtained was coated on the silicon carbide structure surface by means of a brush by the same procedure and conditions as in Example 1.

Good sealing effect on the leakage of zinc vapor and molten zinc was attained without interrupting the operation. The peripheral margin of the coating has a good adhesiveness to the substrate without peeling off.

What we claim is:

1. A repairing mortar for silicon carbide bricks comprising about 60–85% by weight of zircon, about 0.5–2.0% by weight of borates or boric acid, about 3–10% by weight of phosphoric acid, about 0.5–2.0% by weight of colloidal silica and 0–20% by weight of agalmatolite or kaolin.

2. The repairing mortar according to claim 1 wherein said zircon is composed of about 23–37% by weight of coarse particles of 50–100 mesh and about 63–77% by weight of fine particles of more than 100 mesh.

3. The repairing mortar according to claim 1, comprising about 15–25% by weight of zircon particles of 50–100 mesh, about 45–60% by weight of zircon particles of more than 100 mesh, about 0.5–2.0% by weight of borates or boric acid, about 3–10% be weight of phosphoric acid, about 0.5–20% by weight of colloidal silica and 0–20% by weight of water.

4. The repairing mortar according to claim 1 wherein the amount of agalmatolite or kaolin is within the range of about 5–20% by weight.

5. The repairing mortar according to claim 1, comprising about 15–25% by weight of zircon particles of 50–100 mesh, about 45–60% by weight of zircon particles of more than 100 mesh, about 0.5–2.0% by weight of borates or boric acid, about 3–10% by weight of phosphoric acid, about 0.5–2.0% by weight of colloidal silica, about 5–20% by weight of agalmatolite of kaolin and 0–20% by weight of water.

* * * * *